(12) United States Patent
Lekgoathi et al.

(10) Patent No.: US 10,442,698 B2
(45) Date of Patent: Oct. 15, 2019

(54) PRODUCTION OF A HEXAFLUOROPHOSPHATE SALT AND OF PHOSPHOROUS PENTAFLUORIDE

(71) Applicant: The South African Nuclear Energy Corporation Limited, Pelindaba (ZA)

(72) Inventors: Mpho Diphago Stanley Lekgoathi, Pretoria (ZA); Johannes Petrus Le Roux, Pretoria (ZA)

(73) Assignee: THE SOUTH AFRICAN NUCLEAR ENERGY CORPORATION LIMITED, Pelindaba (ZA)

( * ) Notice: Subject to any disclaimer, the term of this patent is extended or adjusted under 35 U.S.C. 154(b) by 310 days.

(21) Appl. No.: 15/300,738

(22) PCT Filed: Mar. 31, 2014

(86) PCT No.: PCT/IB2014/060328
§ 371 (c)(1),
(2) Date: Sep. 29, 2016

(87) PCT Pub. No.: WO2015/150862
PCT Pub. Date: Oct. 8, 2015

(65) Prior Publication Data
US 2017/0015563 A1    Jan. 19, 2017

(51) Int. Cl.
*C01B 25/10* (2006.01)
*C01D 15/00* (2006.01)
(Continued)

(52) U.S. Cl.
CPC .............. *C01D 13/00* (2013.01); *C01B 25/10* (2013.01); *C01D 15/005* (2013.01);
(Continued)

(58) Field of Classification Search
CPC ................................................ C01B 25/00–10
See application file for complete search history.

(56) References Cited

U.S. PATENT DOCUMENTS 5,993,767 A * 11/1999 Willmann ............... C07F 1/005
423/301
2010/0317511 A1    12/2010 Waki et al.

FOREIGN PATENT DOCUMENTS

EP          2 319 800 A1    5/2011

OTHER PUBLICATIONS

Syed et al. ("Pyridinium poly(hydrogen) fluoride—a reagent for the preparation of hexafluorophosphates", Journal of Fluorine Chemistry, 23, pp. 509-514, 1983.*

(Continued)

*Primary Examiner* — Colleen P Dunn
(74) *Attorney, Agent, or Firm* — Seed IP Law Group LLP (57) ABSTRACT

A process for producing a hexafluorophosphate salt comprises neutralizing hexafluorophosphoric acid with an organic Lewis base, to obtain an organic hexafluorophosphate salt. The organic hexafluorophosphate salt is reacted with an alkali hydroxide selected from an alkali metal hydroxide (other than LiOH) and an alkaline earth metal hydroxide, in a non-aqueous suspension medium, to obtain an alkali hexafluorophosphate salt as a precipitate. A liquid phase comprising the non-aqueous suspension medium, any unreacted organic Lewis base and any water that has formed during the reaction to form the precipitate, is removed. Thereby, the alkali hexafluorophosphate salt is recovered.

13 Claims, 12 Drawing Sheets

(51) Int. Cl.
*H01M 10/0525* (2010.01)
*H01M 10/0568* (2010.01)
*C01D 13/00* (2006.01)

(52) U.S. Cl.
CPC ... *H01M 10/0525* (2013.01); *H01M 10/0568* (2013.01); *Y02P 20/582* (2015.11); *Y02P 30/20* (2015.11)

(56) References Cited

OTHER PUBLICATIONS

Campion, C.L. et al., "Thermal Decomposition of $LiPF_6$-Based Electrolytes for Lithium-Ion Batteries," *Journal of the Electrochemical Society,* 2005, 152(12):A2327-A2334.

Tasaki, K. et al., "Decomposition of $LiPF_6$ and Stability of $PF_5$ in Li-Ion Battery Electrolytes," *Journal of the Electrochemical Society,* 2003, 150(12):A1628-A1636.

Liu, X. et al., "Kinetics of Thermal Decomposition of Lithium Hexafluorophosphate," *Chinese Journal of Chemical Physics,* 2013, 26(4):467-470.

* cited by examiner

PRODUCTION OF A HEXAFLUOROPHOSPHATE SALT AND OF PHOSPHOROUS PENTAFLUORIDE

THIS INVENTION relates to the production of a hexafluorophosphate salt and of phosphorous pentafluoride. In particular, it relates to processes for producing a hexafluorophosphate salt and phosphorous pentafluoride respectively.

Lithium hexafluorophosphate ($LiPF_6$), when dissolved in an organic solvent, is used as an electrolyte component in Li-ion batteries. The salt, i.e. $LiPF_6$, has a high solubility, and once dissolved in the organic medium, has a high conductivity and is safe to use in batteries. Due to the current attractive market conditions for electronic devices such as cell phones, laptops and other derivatives of these products, which mostly use lithium-ion batteries, there is a demand for good quality lithium hexafluorophosphate salt with good yields for commercial purposes.

$LiPF_6$ salt constantly decomposes to give off $PF_5$ gas and a LiF solid residue. This decomposition reaction is reversible, so that under the right conditions a combination of $PF_5$ gas and LiF solid will form the $LiPF_6$ salt. This route is a well known and industrially viable technique to produce the salt. However, the purity requirements for electrolyte grade $LiPF_6$ impose a similar high purity requirement on the production of $PF_5$ gas.

In general, various production routes for the synthesis of $LiPF_6$ have been proposed and implemented with varying degrees of yield and purity. Broadly, these methods range from wet through non-aqueous (dry, but typically in non-aqueous solvents) to dry solid state or gaseous methods. The majority of these methods use $PF_5$ gas from an external source as one reagent, while in other cases either $PF_5$ gas or a $PF_6^-$ cation is generated in situ through an intermediate reaction. It is therefore important to have a source of high purity $PF_5$ (or $PF_6^-$) to achieve the purity requirements for the $LiPF_6$ electrolyte.

The wet or aqueous routes typically end up with hydrolysis and contamination of $LiPF_6$, while the presence of organic or inorganic substances also forms an adduct with the $LiPF_6$, which is difficult to remove. At the other end of the scale solid state thermal routes involving heating compressed pellets of dry reagent powders tend to be incomplete resulting in low yield. Dry gaseous routes using phosphorus, fluorine and LiF in a complex sequence of steps from cryogenic to elevated temperature stages also deliver high purity $LiPF_6$, but are cumbersome techniques.

Most widely used methods are the dry (anhydrous) routes, typically reacting $PF_5$ with LiF in the presence of either an organic solvent or anhydrous hydrogen fluoride. Handling of the hazardous reagents and the purification of the product have called for innovative methods, ranging from cryogenic distillation to forming intermediate complexes to isolate impurities and/or contaminants. The technique involving suspension of LiF in anhydrous HF and passing $PF_5$ gas through apparently is a commercially viable route and the most preferred for the synthesis of $LiPF_6$.

Other methods, commercially not very popular, use a wet chemical synthesis route, such as the reaction between hexafluorophosphoric acid ($HPF_6$) and a lithium source, e.g. LiOH, and where the solvate ion is stabilized in pyridine to form a water stable organic pyridinium complex as claimed in the U.S. Pat. No. 5,993,767. The pyridinium compound prevents hydrolysis of the complexed $LiPF_6$, so that the $LiPF_6$ can finally be obtained by thermal decomposition of the complex. This method has advantages as it uses readily available reactants such as pyridine or other associated organic molecules and $HPF_6$, a product of HF and phosphoric acid. The problem associated with this method is that the $LiPF_6$-pyridine complex formed is thermally stable at temperatures of up to 400° C. and will not readily decompose to yield the $LiPF_6$ salt. This direct route for $LiPF_6$ synthesis is not efficient and viable because separation of $LiPF_6$ from pyridine is hardly possible, and will typically result in thermal decomposition of $LiPF_6$ itself into $PF_5$ gas and solid LiF. Thus, the stability of this organic complex is the Achilles heel of this technique and other related wet chemical processes, including those processes that complex organic substances such as acetonitrile with $LiPF_6$ for purification of this salt.

Several methods have been investigated for the production of $LiPF_6$, but only few have been successfully commercialized. The challenges include yield, handling of the $LiPF_6$ in moisture free conditions and the purity of the product. A technique involving suspension of LiF in anhydrous HF and passing $PF_5$ gas through seems to be a commercially viable and the most preferred route for the synthesis of $LiPF_6$.

The phosphorus pentafluoride gas used as an intermediate during the dry synthesis routes is normally obtained by one of the following methods:
(i) reaction of phosphorus with fluorine gas, such as in Pat. Publ, No: US 2010/0233057;
(ii) reaction of $PCl_5$ with HF, such as in U.S. Pat. No. 3,634,034;
(iv) a reaction in which HF vapour is bubbled through hexafluorophosphoric acid ($HPF_6$) solution, where the $HPF_6$ solution was obtained from a reaction of $P_2O_5$ and HF, such as in EP 2311776 A1;
(v) reaction of phosphorus trifluoride with bromine to form phosphorus trifluoride dibromide, $PF_3Br_2$, which can be heated to yield $PF_5$ gas (http://site.iugaza.edu.ps/bgeshta/files/2010/02/94398_17.pdf) accessed 31 Jul. 2013; and
(vi) other well-known dry preparation methods for $PF_5$ including a reaction of $P_2O_5$ with $CaF_2$ followed by thermal decomposition or the thermal decomposition of alkali metal salts such as $KPF_6$, $NaPF_6$ and $LiPF_6$.

Processes involving chlorine and fluorine exchange require extensive and special fractionation to give purer products with less mixed halides, while other processes suffer from the need for separation of products. It is therefore seen as a need to make pure $PF_5$ gas without having to deal with multiple gas evolution which requires special separation techniques. Similarly, there is a need to make a hexafluorophosphate salt from which high purity $PF_5$ gas can be obtained.

According to a first aspect of the invention, there is provided a process for producing a hexafluorophosphate salt, the process comprising
  neutralizing hexafluorophosphoric acid with an organic Lewis base, to obtain an organic hexafluorophosphate salt;
  reacting the organic hexafluorophosphate salt with an alkali hydroxide selected from an alkali metal hydroxide (other than LiOH) and an alkaline earth metal hydroxide, in a non-aqueous suspension medium, to obtain an alkali hexafluorophosphate salt as a precipitate; and
  removing a liquid phase comprising the non-aqueous suspension medium, any unreacted organic Lewis base and any water that has formed during the reaction to form the precipitate, thereby to recover the alkali hexafluorophosphate salt.

According to a second aspect of the invention, there is provided a process for producing phosphorous pentafluoride, the process comprising
neutralizing hexafluorophosphoric acid with an organic Lewis base, to obtain an organic hexafluorophosphate salt;
reacting the organic hexafluorophosphate salt with an alkali hydroxide selected from an alkali metal hydroxide (other than LiOH) and an alkaline earth metal hydroxide, in a non-aqueous suspension medium, to obtain an alkali hexafluorophosphate salt as a precipitate;
removing a liquid phase comprising the non-aqueous suspension medium, any unreacted organic Lewis base and any water that has formed during the reaction to form the precipitate, thereby to recover the alkali hexafluorophosphate salt; and
thermally decomposing the alkali hexafluorophosphate salt to obtain gaseous phosphorus pentafluoride and an alkali fluoride as a non-gaseous residue.

In the second aspect of the invention, the thermal decomposition of the alkali hexafluorophosphate salt, i.e. the alkali metal or the alkaline earth metal hexafluorophosphate salt, may be effected at a temperature of up to 600° C. For example, for potassium hexafluorophosphate the thermal decomposition may be effected at about 600° C., while for sodium hexafluorophosphate the thermal decomposition may be effected at about 400° C. The thermal decomposition may be effected under a partial vacuum; it may also be effected under an inert atmosphere, e.g. a helium atmosphere.

The process may include reacting phosphoric acid with anhydrous hydrogen fluoride or aqueous hydrofluoric acid, to obtain the hexafluorophosphoric acid.

The neutralization of the hexafluorophosphoric acid with the amine must be performed under conditions such that only the strong $HPF_6$ component is neutralized while the other weaker break down components of the acid are excluded from the reaction. Therefore the stoichiometric quantity of amine to conclude the reaction up to that point has to be determined by careful titration. This will ensure a high purity organic hexafluorophosphate salt for the subsequent step of forming the alkali hexafluorophosphate salt.

The organic Lewis base may be an organic amine. The organic amine may be selected from pyridine, imidazole, and pyrole; in particular the organic amine may be pyridine.

The alkali of the alkali hydroxide is thus an alkali metal of Group I of the Periodic Table of Elements, but excluding lithium, or it is an alkaline earth metal of Group II of the Periodic Table of Elements. More particularly, the alkali hydroxide may be selected from sodium hydroxide and potassium hydroxide; in particular, the alkali metal hydroxide may be sodium hydroxide.

The non-aqueous suspension medium may be an organic solvent. The organic solvent may comprise methanol or ethanol; in particular, the solvent may comprise ethanol.

Instead, the non-aqueous suspension medium may be an aprotic medium. The aprotic medium may comprise an alkyl carbonate, a tetrahydrofuran ether, or acetonitrile.

The removal of the liquid phase may be effected by decanting excess liquid phase from the precipitate. It may also include heating the precipitate to a temperature up to 200° C. to evaporate residual liquid phase present on the precipitate.

The invention thus provides, in the second aspect of the invention, a process for producing pure gaseous phosphorus pentafluoride ($PF_5$). The first aspect of the invention provides a process for producing an alkali metal or an alkaline earth metal hexafluorophosphate salt, which can be expressed as $XPF_6$, where X is a cation selected from an alkali metal or an alkaline earth metal, with the proviso that when it is an alkali metal it is not Li. The $XPF_6$ salt is a source or starting material from which high purity $PF_5$ can readily be obtained.

U.S. Pat. No. 5,993,767 attempted to synthesize $LiPF_6$ salt from a reaction of lithium hydroxide and pyridinium hexafluorophosphate ($C_5H_5NHPF_6$), a substance obtained by reacting pyridine and hexafluorophosphoric acid, to form the intermediate $LiPF_6$-pyridine complex or $C_5H_5NLiPF_6$. The application of this method turned out to be unsuccessful, since as described hereinbefore, the pyridine could not be detached from the resulting complex. However, the inventors surprisingly found that compounds like $NaPF_6$ and $KPF_6$ could be produced in their pure form. These compounds form no stable complexes with pyridine and other related organic molecules as opposed to the $LiPF_6$-pyridine complex, and the whole pyridine molecule is readily displaced at relatively low temperatures, yielding the respective hexafluorophosphate salts of high purity. These pure salts present an opportunity because their thermal decomposition produce $PF_5$ gas, the desired precursor for the synthesis of $LiPF_6$ using the preferred method as hereinbefore described and in which this gas is reacted with solid LiF in the presence of either an organic solvent or anhydrous hydrogen fluoride.

The high purity $PF_5$ gas thus formed may be used to synthesize $LiPF_6$ of high purity by any one of the known industrial synthesis routes, e.g. by bubbling it through LiF in anhydrous HF.

The invention will now be described in more detail with reference to the accompanying drawings and the following non-limiting Examples.

One embodiment of the invention described hereunder, encompasses the synthesis of $C_5H_5NHPF_6$ (pyridinium hexafluorophosphate) as a precursor for obtaining for example pure $KPF_6$ salt, the conversion of $C_5H_5NHPF_6$ to the salt and the isolation of the pure salt, which is a good $PF_5$ gas generator.

Figure 1:
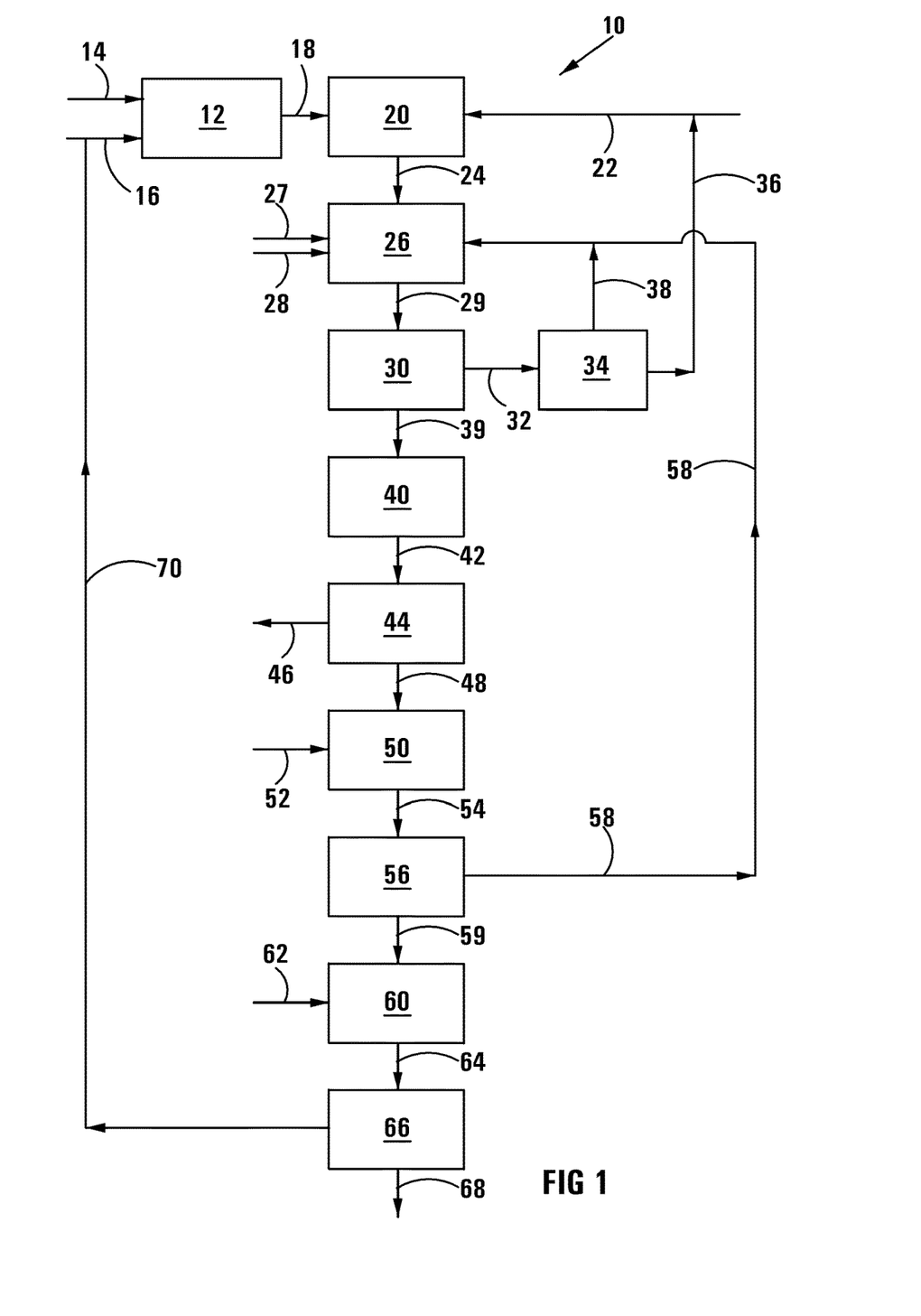
FIG. 1 shows, in simplified flow diagram form, a process for producing pure gaseous phosphorus pentafluoride ($PF_5$), in accordance with the invention.

Referring to FIG. 1, reference numeral 10 generally indicates a process for producing pure phosphorus pentafluoride ($PF_5$) gas, in accordance with the invention.

The process 10 includes a first reaction stage 12, with a $H_3PO_4$ feed line 14 as well as an HF feed line 16 leading into the stage 12. In the stage 12, $H_3PO_4$ and HF react to give hexafluorophosphoric acid and water, in accordance with reaction (1):

$$6HF + H_3PO_4 \rightarrow HPF_6 + 4H_2O \tag{1}$$

The reaction products from the stage 12 pass, along a flow line 18, to a second reaction stage 20. A pyridine ($C_5H_5N$) addition line 22 leads into the stage 20. In the reaction stage 20, the hexafluorophosphoric acid is neutralized by means of pyridine, which thus constitutes an organic Lewis base, in accordance with reaction (2):

$$HPF_{6(aq)} + C_5H_5N \rightarrow C_5H_5NHPF_{6(s)} \tag{2}$$

The solid reaction product from the stage 20 passes, along a flow line 24, to a stage 26, with a solid KOH addition line 27 as well as an ethanol (solvent) (EtOH) addition line 28 also leading into the stage 26. In the stage 26, the organic hexafluorophosphate salt that is formed in the stage 20, is reacted with the KOH in accordance with reaction (3):

$$C_5H_5NHPF_6 + KOH \xrightarrow{EtOH} KPF_{6(s)} + C_5H_5N_{(aq)} + H_2O_{(l)} \tag{3}$$

The reaction products from the stage 26 pass along a line 29 to a separation stage 30 where the precipitate, i.e. $KPF_6$, is separated from a liquid phase comprising regenerated pyridine, water and ethanol.

The liquid phase passes from the stage 30 along a flow line 32 to a stage 34 where the pyridine is separated from the ethanol. The pyridine and water are recycled from the stage 34, along a flow line 36, to the stage 20, while the ethanol is recycled, along a flow line 38, to the stage 26.

The solid, wet $KPF_6$ passes from the stage 30, along a transfer line 39, to a drying stage 40 where it is dried at a temperature of 100° C. to 200° C. The dried $KPF_6$ passes from the stage 40 along a transfer line 42 to a thermal decomposition stage 44 in which the $KPF_6$ is thermally decomposed at a temperature up to 600° C., in accordance with reaction (4):

$$KPF_6 \rightarrow PF_5 + 2KF_{(s)} \tag{4}$$

The resultant pure gaseous $PF_5$ is withdrawn from the stage 44 along the line 46. The KF that is produced in accordance with the reaction 4 is withdrawn from the stage 44 along a line 48, to a stage 50. A $Ca(OH)_2$ addition line 52 leads into the stage 50. In the stage 50, the $Ca(OH)_2$ reacts with the KF in accordance with reaction (5) to yield KOH and $CaF_2$:

$$2KF + Ca(OH)_2 \rightarrow KOH + CaF_2 \tag{5}$$

These reaction products pass from the stage 50 along a line 54 to a separation stage 56 where the KOH is separated from the $CaF_2$. The KOH is recycled from the stage 56 to the stage 26, along a line 58.

The $CaF_2$ passes from the stage 56 to a reaction stage 60 along a line 59. A $H_2SO_4$ addition line 62 leads into the stage 60. In the stage 60, the $CaF_2$ reacts with the $H_2SO_4$ in accordance with reaction (6) to produce solid $CaSO_4$ as well as HF:

$$CaF_2 + H_2SO_4 \rightarrow 2HF + CaSO_{4(s)} \tag{6}$$

The reaction products from the stage 60 pass along a flow line 64, to a stage 66 where the HF is separated from the $CaSO_4$. The $CaSO_4$ is withdrawn from the stage 66 along a line 68, while the HF is recycled to the stage 12 along a line 70.

Hexafluorophosphoric acid ($HPF_6$) is a complex ionic mixture of weak and strong acids which constantly decompose at room temperature. In order to determine a good estimate for the stoichiometric quantity of pyridine required to neutralize only the stronger $HPF_6$ component, the reaction end point was predetermined by conductivity titration using $HPF_6$ and NaOH solutions. The molar concentration obtained from this titration end point value was used to determine the stoichiometric quantities of $C_5H_5N$ and $HPF_6$ for the formation of a pure $C_5H_5NHPF_6$ compound.

EXAMPLE 1

Figure 2:
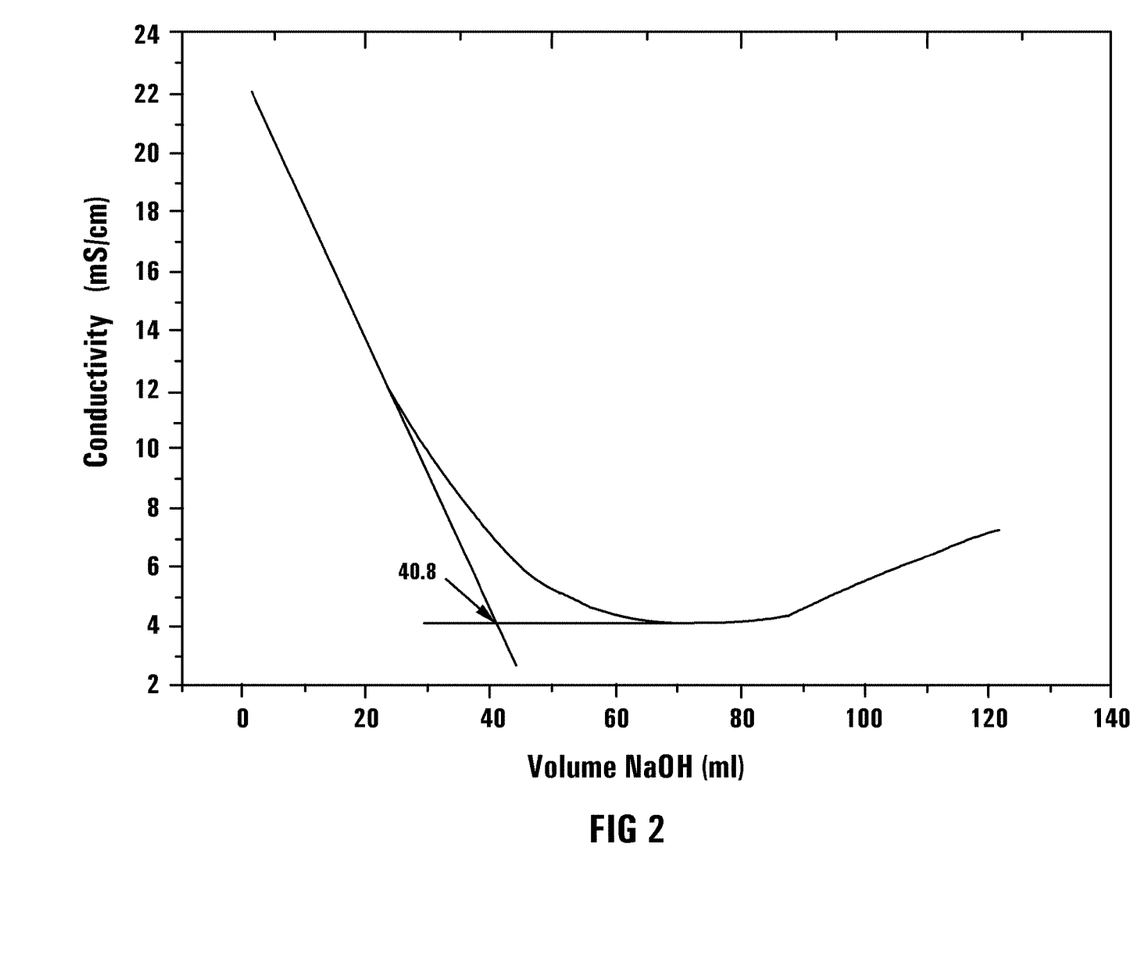
FIG. 2 shows, for Example 1, a plot of conductivity vs volume during titration of $HPF_6$ solution with NaOH.

In order to determine the molar concentration of $HPF_6$ in the acid solution for the stoichiometric addition of pyridine in stage 20 of FIG. 1, a sodium hydroxide standard solution of 0.1 M concentration was used to titrate an $HPF_6$ solution because NaOH does not form a precipitate during the reaction. A 600 µl aliquot of $HPF_6$ solution was diluted to 100 ml with distilled water and titrated with the 0.1 M solution of NaOH. An Orion 4 Star conductivity meter fitted with a platinum electrode was used to measure the conductivity of the reaction mixture during titration. The solution was constantly stirred with a magnetic stirrer to ensure OH-/H+ equilibrium. Conductivity changes were measured after every addition of 5 ml of titrant. The corresponding conductivity value and volume were recorded. The end point of the titration is marked by the vertex point or bend in the conductivity graph where the steep decline in conductivity values due to depleted strong acid ions (FIG. 2) changes to a more moderate slope, which is determined by the intersection of the tangents to the straight sections of the graph as shown. The thus determined end point corresponds to 40.8 ml of NaOH in 100 ml of $HPF_6$ solution, which equalises to 0.00408 mol NaOH and translates to a molar concentration of the HPF6 of 6.80 mol per liter.

This molar concentration was then applied during the reaction of $HPF_6$ with pyridine to produce pyridinium hexafluorophosphate ($C_5H_5NHPF_6$). The reaction of pyridine with $HPF_6$ is very exothermic and therefore water is used as a cooling medium to minimize volatilization of the reactants and improve the yield. Pyridine (18 ml) was slowly added (drop wise) to a commercial $HPF_6$ solution (10 ml) purchased from Alfa Aeser diluted to 200 ml with distilled water. A product precipitated out. The precipitate was filtered using a Whatman No. 42 filter paper and dried overnight in an oven at 110° C. In the repeat experiment, the water previously recovered during filtration was topped up to 200 ml with distilled water and re-used. This helped to minimize the loss of the product through solubility and thus improved the yield.

Figure 3:
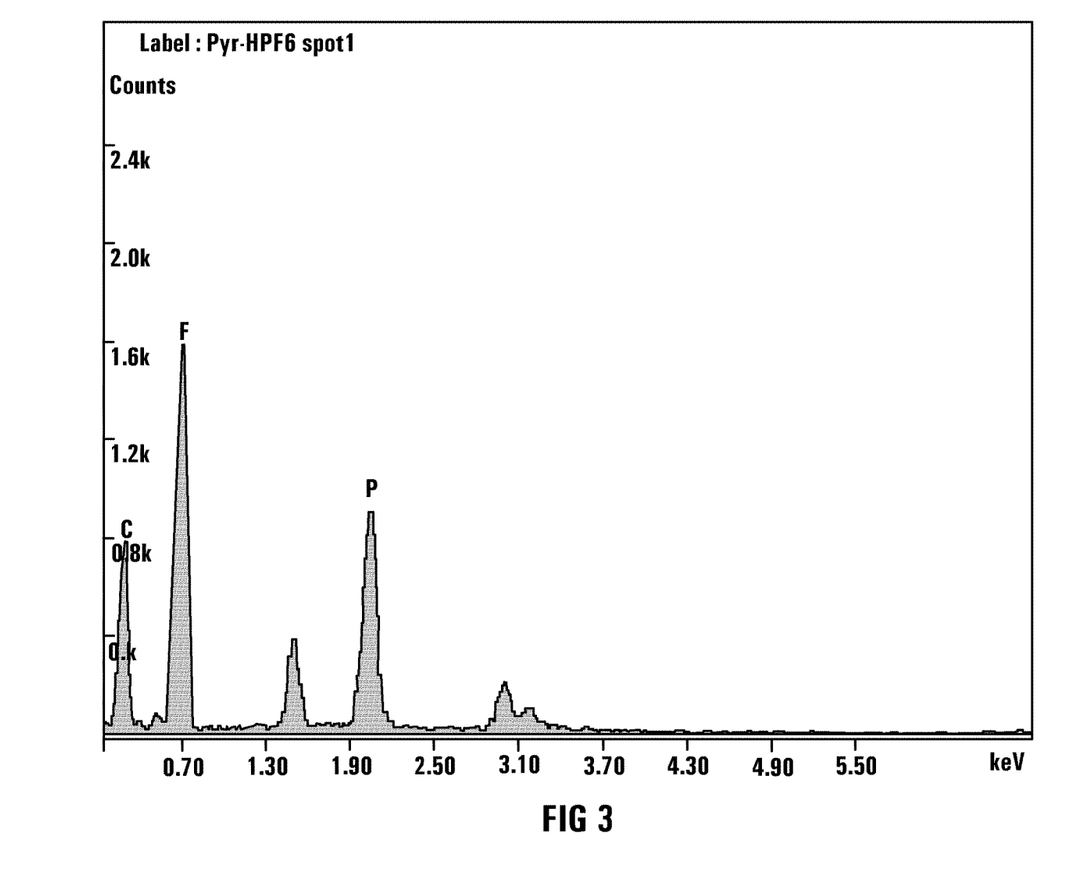
FIG. 3 shows, for Example 1, an EDX elemental scan of $C_5H_5NHPF_6$.

The precipitated product comprised a white powder of pyridinium hexafluorophosphate, and was obtained with an average yield of 95% based on the recovery from repeated experiments. This powder was characterized using inductively coupled plasma (ICP), nitrogen, oxygen, sulphur and carbon combustion process and other techniques such as EDX (FIG. 3) and ISE (ion selective electrode, particularly fluoride ion). Table 1 lists the elemental composition of the pyridinium hexafluorophosphate powder obtained by different techniques.

TABLE 1

Percentage elemental composition of $C_5H_5NHPF_6$

| | Percent Composition (m/m) | | | |
|---|---|---|---|---|
| Element | Theoretical | ICP | EDX | Combustion | ISE |
| F | 50.6 | — | 39 | — | 52.39 |
| H | 2.7 | — | — | — | — |
| N | 6.2 | — | 5.8 | 5.55 | — |
| C | 26.7 | — | — | 24.2 | — |
| P | 13.8 | 13.40 | 11.21 | — | — |

Figure 4:
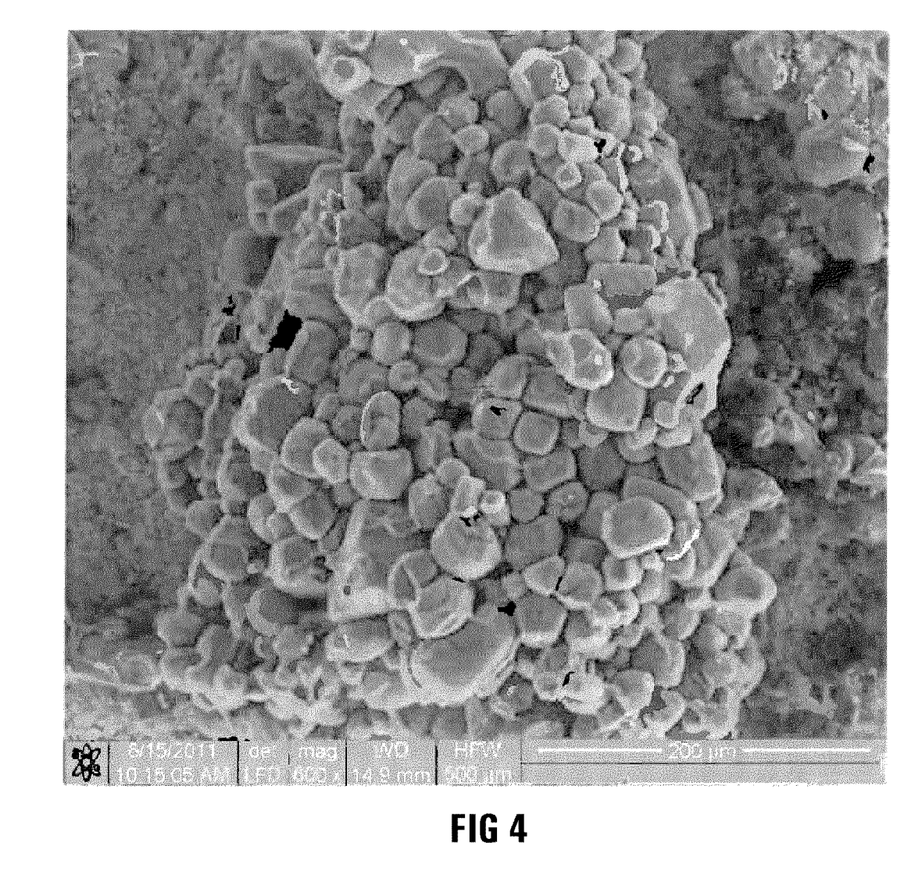
FIG. 4 shows, for Example 1, a SEM image of the synthesized $C_5H_5NHPF_6$.
Figure 5:
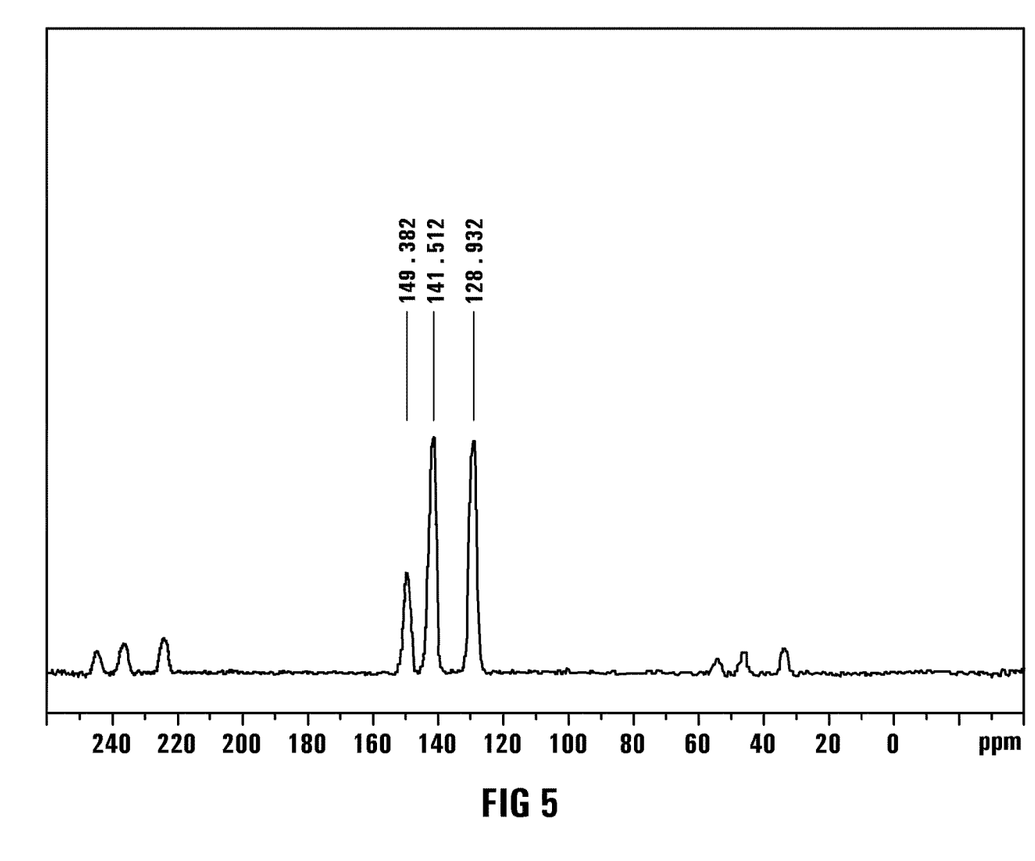
FIG. 5 shows, for Example 1, the $^{13}C$ NMR spectrum of the synthesized solid $C_5H_5NHPF_6$.

Scanning electron microscope (SEM) photos show that the compound has small particles of approximately 40 μm in diameter (FIG. 4). NMR results (FIG. 5) confirm that there is a strong electron withdrawing group in the pyridinium hexafluorophosphate, which supports the conclusion that pyridinium hexafluorophosphate as a compound was formed.

EXAMPLE 2

In a laboratory simulation of the stage 26 of FIG. 1, the chemical reaction between pyridinium hexafluorophosphate and an alkali metal hydroxide such as sodium or potassium hydroxide in the presence of ethyl alcohol forms the $XPF_6$ salt (where X is sodium or potassium), while liberating pyridine gas, leaving a solid alkali metal hexafluorophosphate as a product (in accordance with equations or reactions 7 and 3 respectively).

(7)

For example, the sodium hexafluorophosphate was synthesised by adding 0.8 g of NaOH pellets to a 50-ml ethanol solution and then reacting with 4.5 g of suspended $C_5H_5NHPF_6$, previously synthesised as described above. The mixture was continuously stirred for 10 minutes, during which time a precipitate formed. The liquid phase containing water, the pyridine and ethanol was decanted. The precipitate was filtered and dried overnight at 90° C. in an oven to remove impurities and excess pyridine. The resulting white powder was stored in a glove box filled with nitrogen.

For the synthesis of the potassium hexafluorophosphate, 1.1 g of KOH powder was reacted in the place of NaOH, and the procedure outlined for the synthesis of the sodium salt was followed.

When applying the reaction of pyridinium hexafluorophosphate to LiOH, the inventors found that lithium hexafluorophosphate could not be obtained in this direct synthesis method (Equation 8) as is the case for sodium and potassium salts, but instead forms a stable $LiPF_6$-pyridine complex.

(8)

Comparative analyses with FTIR and Raman spectra (FIGS. 6 and 7) confirm that the Li-species contains significant amounts of pyridine.

Figure 6:
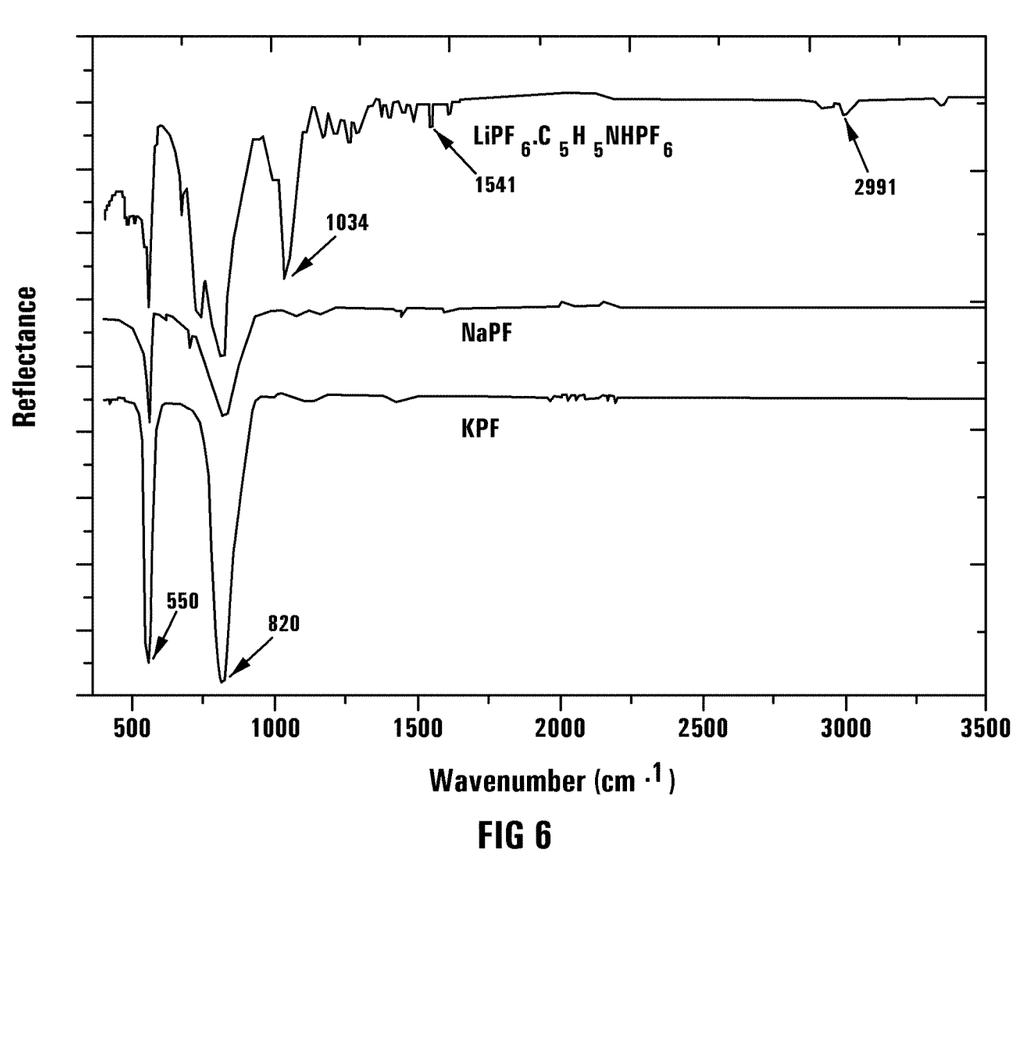
FIG. 6 shows, for Example 2, FTIR spectra of the synthesized $MPF_6$-salts or pyridine complexes.
Figure 7:
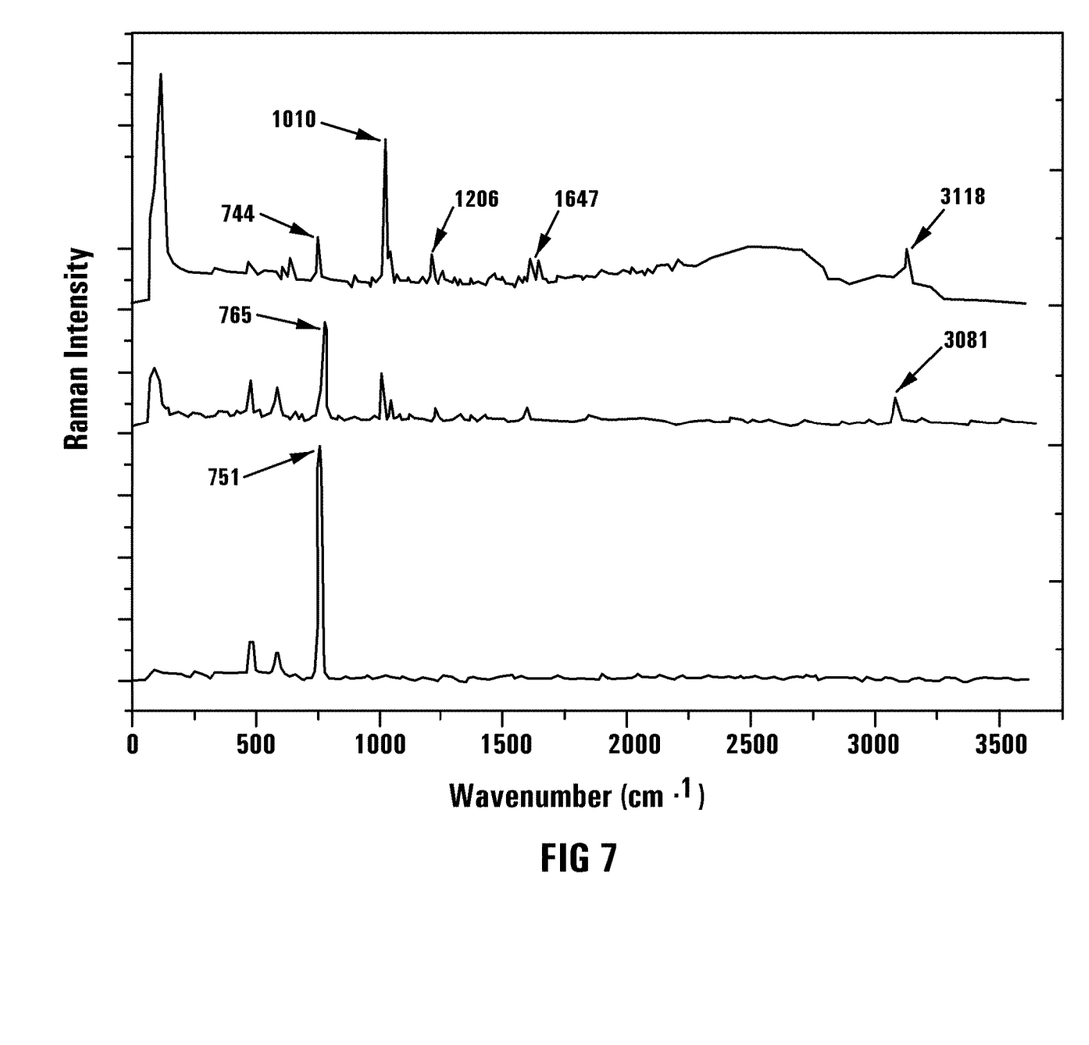
FIG. 7 shows, for Example 2, Raman spectra of the synthesized $MPF_6$-products—$LiPF_6$-pyridine complex (top line or spectrum), $NaPF_6$ salt (middle line or spectrum) and $KPF_6$ salt (bottom line or spectrum)

In contrast, the reactions between pyridinium hexafluorophosphate and the sodium or potassium hydroxide apparently do not form complexes, but instead rapidly form precipitates of the pure salts of $NaPF_6$ and $KPF_6$, with little or no traces of pyridine, particularly after mild treatment at elevated temperatures (FIG. 6).

Thus, the inventors have found that alkali metal cations other than $Li^+$ such as sodium and potassium cations do not form stable intermediate complexes as opposed to the lithium cation. Apparently, the reaction progresses without delay to form precipitates of pure salts and liberate pyridine and water into the suspension medium. Furthermore, the favourable reaction conditions for the formation of pure sodium and potassium hexafluorophosphate salts present an opportunity for their use as good sources of pure $PF_5$ gas, a precursor in the synthesis of $LiPF_6$.

EXAMPLE 3

In a laboratory simulation of stage 44 of the process 10, the synthesized $KPF_6$ and $NaPF_6$ salts can be subjected to thermal decomposition, e.g. in a tube reactor system (FIG. 8) with the aim of decomposing the salts into a phosphorus pentafluoride gas and a metal fluoride residue according to Equation 9 (also exemplified more specifically by equation or reaction (4) above).

(9)

where M=K or Na.

Figure 8:
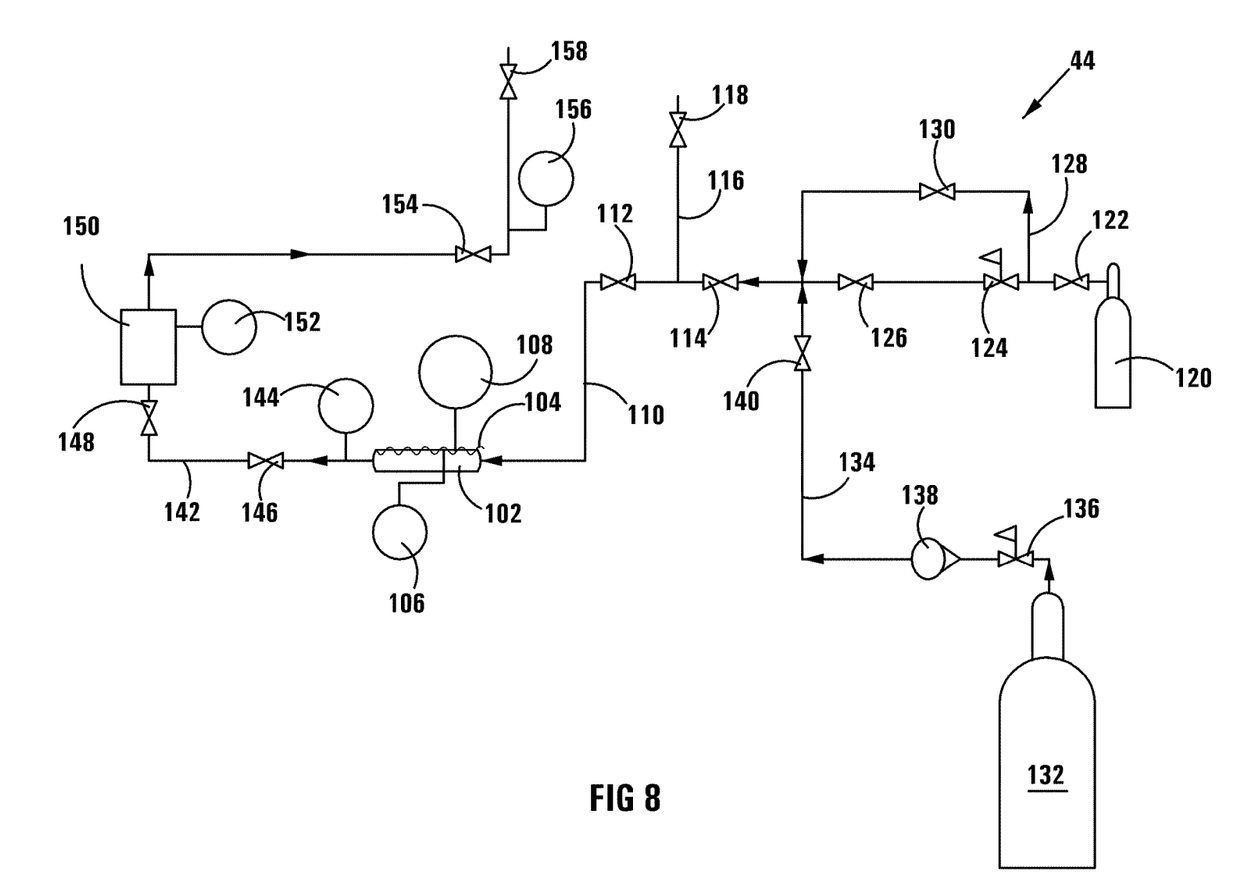
FIG. 8 shows, for Example 3, a process flow diagram of the experimental set-up used for the thermal decomposition of $KPF_6$ and $NaPF_6$.

The laboratory simulation of stage 44, as depicted in FIG. 8, comprises a single 2.54 cm diameter tube reactor 102 manufactured from stainless steel. The tube reactor 102 consists of thick stainless steel walls. The tube reactor 102 is fitted with an electric heating device 104. Uniform heating of the tube reactor 102 is made possible by using the heater 104, which is a conventional heater designed for tube reactors. The tube reactor 102 is fitted with a temperature controller 108.

An inlet tube 110 is connected to an upstream end of the tube reactor 102, and is fitted with a pair of spaced valves 112, 114. Between the valves 112, 114 leads a vacuum line 116 fitted with a valve 118.

The line 110 leads from a $PF_5$ gas cylinder 120 and is fitted with a valve 122, a forward pressure regulator 124 and another valve 126. A bypass line 128 leads from upstream of the flow regulator 124 to downstream of the valve 126 and is fitted with a valve 130. The $PF_5$ gas source was included in the design because $PF_5$ was used as a passivation gas and a reference standard prior to commencing of the thermal decomposition experiments by purging the system and measuring the reference point in the FTIR cell.

The laboratory installation also includes a helium gas cylinder 132 from which leads a line 134 into the line 110 downstream of the valve 126. The line 134 is fitted with a forward pressure regulator 136, a flow indicator 138 and a valve 140. The FTIR gas cell 150 is a flow through 10 cm gas cell fitted with ZnSe windows, and with a pressure transducer 152.

A line 142 leads from the downstream end of the tube reactor 102 and is fitted with a pressure transducer 144, a valve 146 and a further valve 148. The line 142 leads into the gas cell 150.

A line 154 leads from the gas cell 150 to a vacuum generator (not shown) and is fitted with a valve 154, a pressure indicator 156 and a valve 158.

In use, a head space of the tube reactor 102 is evacuated before each run, whereafter helium is allowed to flow continuously through the reactor 102 and the gas cell 150 at atmospheric pressure. The pressure inside the reactor 102 is monitored by the pressure transducer 144. The pressure inside the gas cell is monitored using the pressure transducer 152, while the system pressure is monitored using the pressure transducer 156. The pressures in the gas cylinders 120, 132 are regulated using the forward pressure regulators 124 and 136 respectively. A thermocouple 106 monitors the reaction temperature, while a thermocouple 108 monitors the reactor and heater temperature. The gas cell 150 is evacuated by opening valves 154 and 158 and closing valve 148. Gaseous substances within the system can be analyzed as and when needed by charging the gas cell 150 to a maximum pressure of 1.5 bar, closing the valves 148, 154 and then collecting data using the infrared spectrometer.

Figure 9:
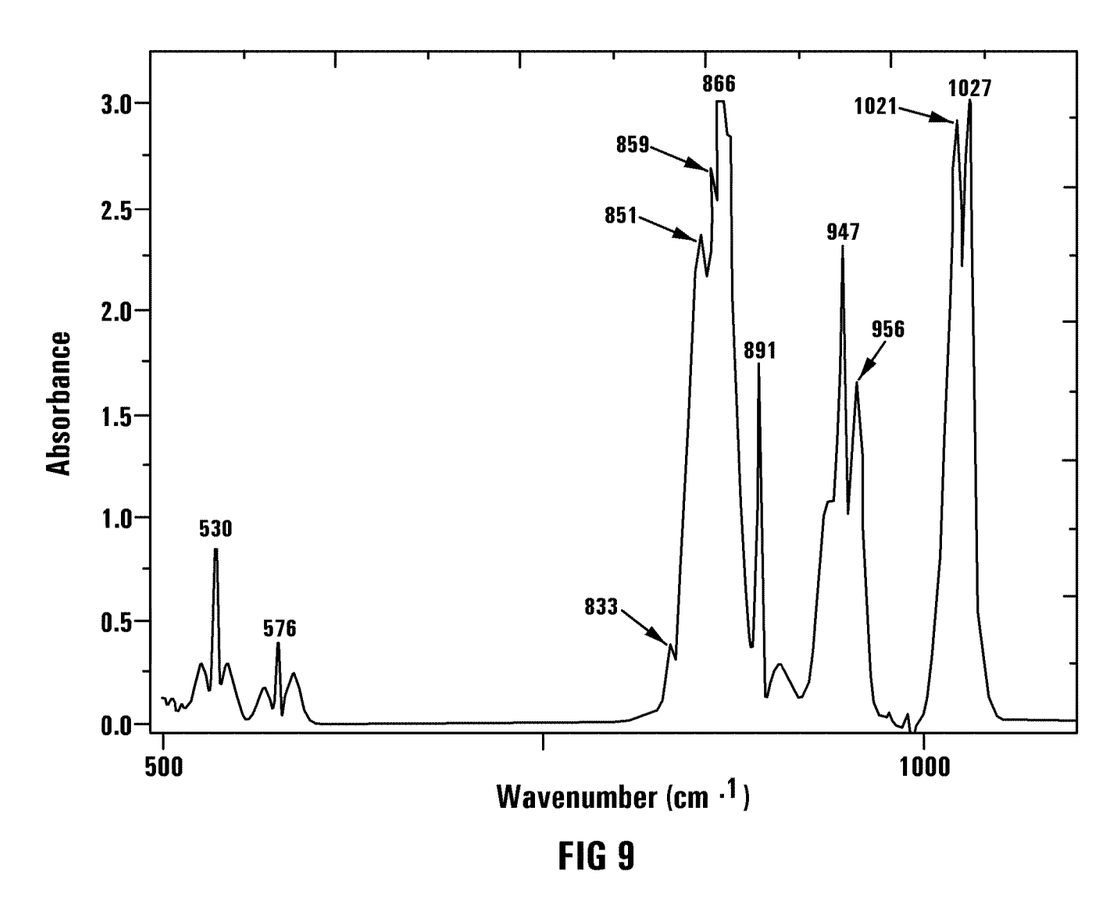
FIG. 9 shows, for Example 3, a FTIR spectrum of the gaseous products formed after thermal decomposition of $KPF_6$ in helium at 600° C.
Figure 10:
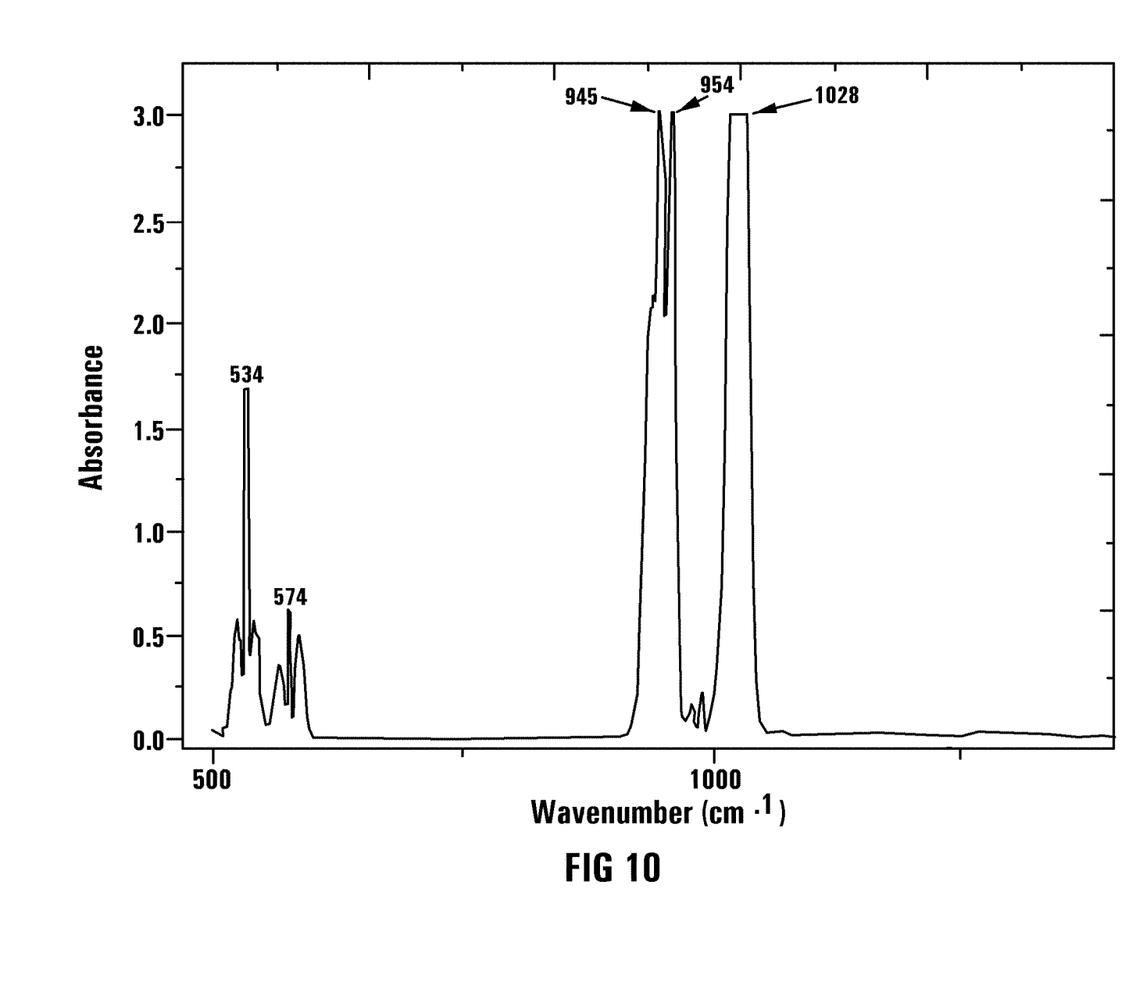
FIG. 10 shows, for Example 3, a FTIR spectrum of the gaseous products from thermal decomposition of $NaPF_6$ salt.
Figure 11:
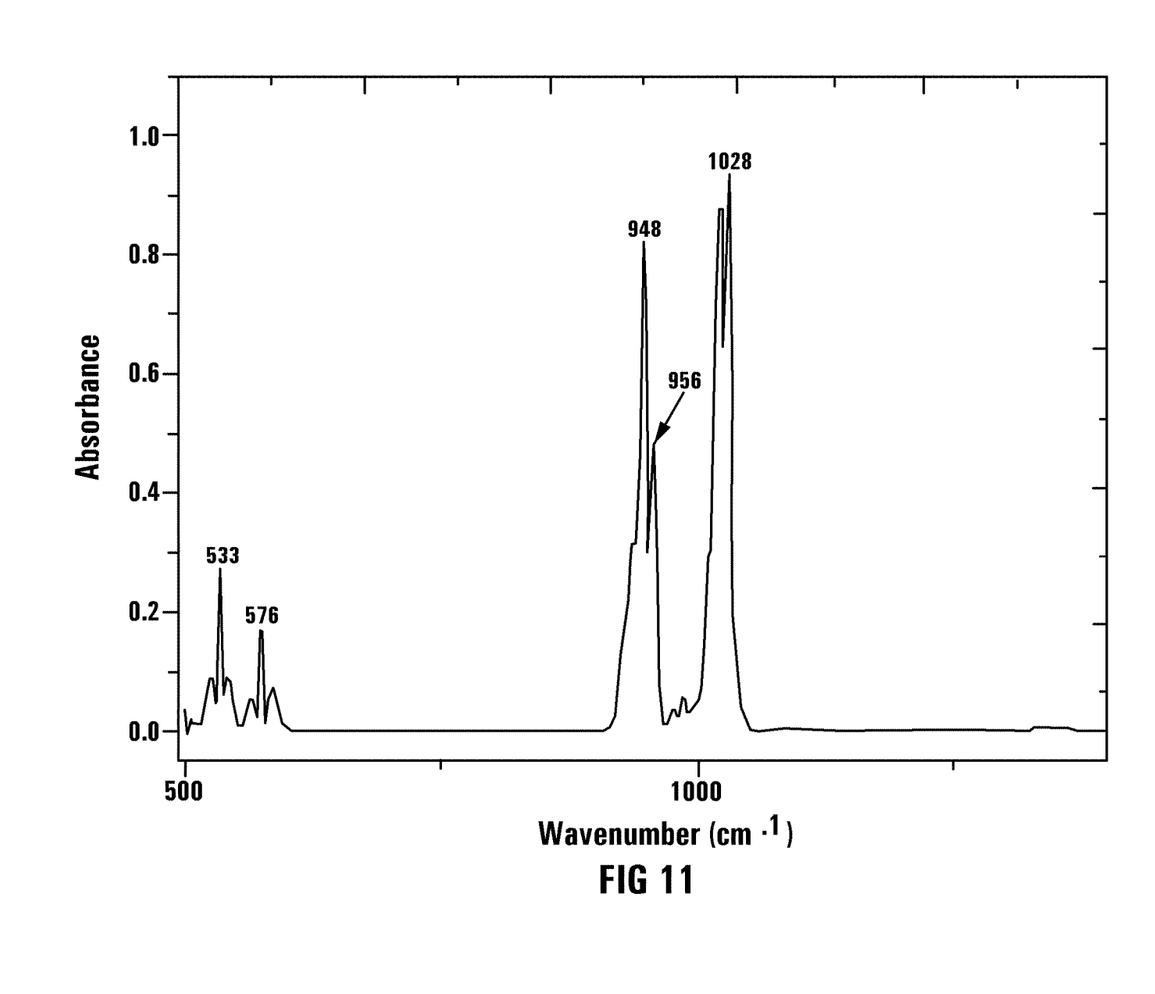
FIG. 11 shows, for Example 3, a FTIR spectrum of a commercial $PF_5$ gas.

Thermal decomposition of $KPF_6$ and $NaPF_6$ is performed under a constant helium flow rate of 100 ml/min, heating the potassium hexafluorophosphate to 600° C. and the sodium hexafluorophosphate to 400° C. respectively. This is followed by constantly monitoring the thermal decomposition pressures (pressure transducer 144) and temperatures (thermocouple 106) on their respective indicators. The $PF_5$ gas generated through thermal decomposition of each of these salts is analysed by allowing the IR spectrometer to measure a spectrum in time and to collect data as and when desired. The results are shown in FIGS. 9 and 10, and can be compared with the FTIR spectrum of commercially available $PF_5$ gas (FIG. 11).

Figure 12:
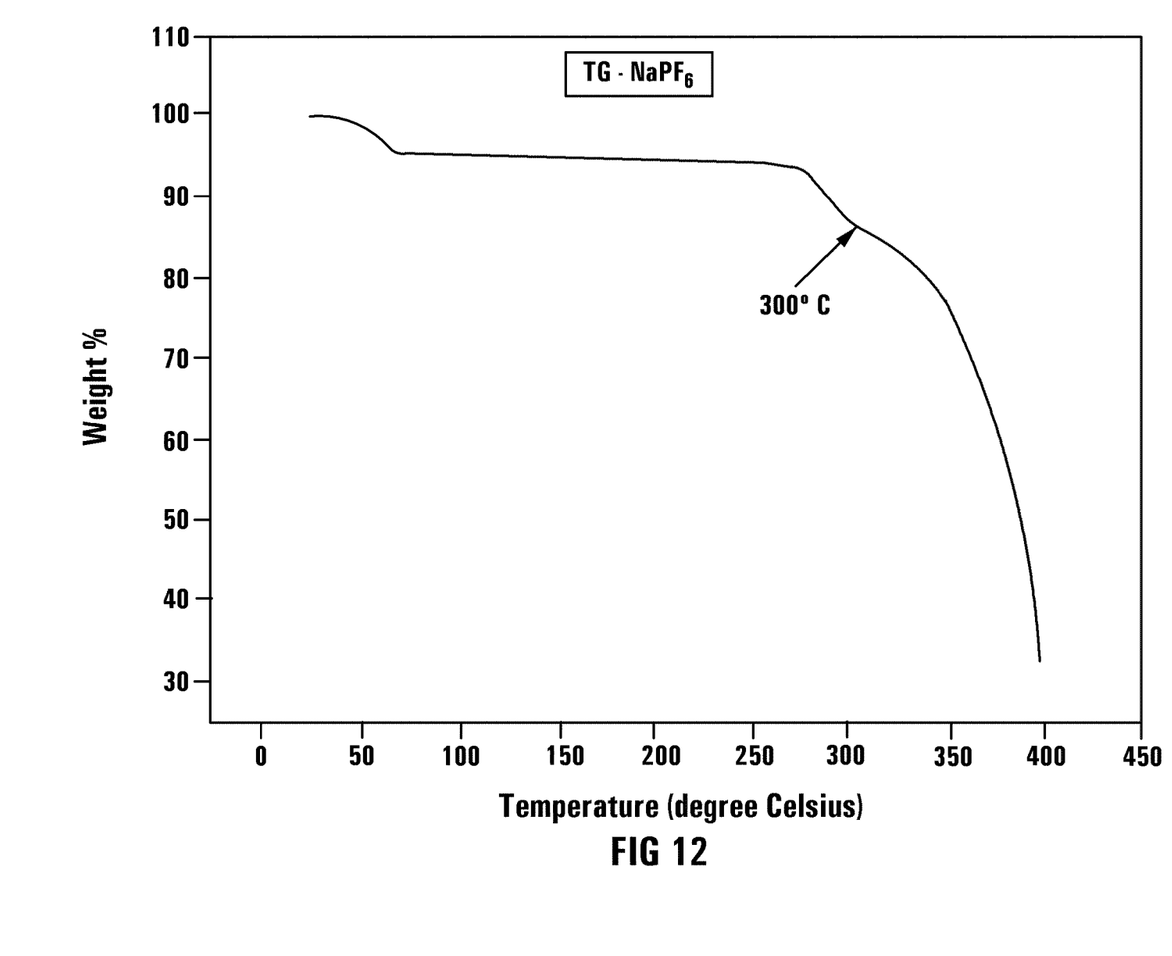
FIG. 12 shows, for Example 3, a thermogravimetric (TG) graph of the decomposition of $NaPF_6$

A pre-heating step at temperatures of up to 300° C. under drying conditions and before $PF_5$ gas is liberated essentially eliminates HF. Impurities other than HF are eliminated by starting with pure feed materials. In FIG. 12, the bend in the TG graph of $NaPF_6$ around 300° C. represents the endpoint of the volatilisation of impurities prior to commencement of the evolution of the pure $PF_5$ gas.

The possibility of synthesizing pure $PF_5$ gas from thermal decomposition of $MPF_6$ salts according to the present invention allows this gas to be produced in a high purity form for further use as a precursor towards synthesis of pure $LiPF_6$. Using the $PF_5$ gas as a precursor is normally realised through a process of applying a known $LiPF_6$ synthesis process (prior art), e.g. by passing the synthesized $PF_5$ gas through lithium fluoride suspended in anhydrous hydrogen fluoride as described before.

The proposed $PF_5$ gas production process of the invention is unique and differs from current industrial processes for producing $PF_5$ gas because it makes it possible to avoid the use of expensive fluorine gas as fluoride source; instead it uses inexpensive hydrogen fluoride but avoids the tedious and environmentally unfriendly chloride route. Advantages of this process are that no gaseous mixtures are formed which require expensive equipment for separation and purification and the process is also designed to recover or recycle most reagents, e.g. the sodium (or potassium) ions used in an intermediate steps can be recovered and re-used in the process, while pyridine and ethanol are recycled. The fluoride that is not bound to the product ($PF_5$) is recoverable as $CaF_2$ which can be recycled to produce HF to feed back into the process as shown in FIG. 1. This makes the process of producing $PF_5$ gas from thermal decomposition of $M^+PF_6^-$ ($M^+=K^+$ or $Na^+$) and then synthesizing pure UP $F_6$ via known processes economically viable.

The invention claimed is:

1. A process for producing a hexafluorophosphate salt, the process comprising
    neutralizing hexafluorophosphoric acid with an organic Lewis base, to obtain an organic hexafluorophosphate salt;
    reacting the organic hexafluorophosphate salt with an alkali hydroxide selected from an alkali metal hydroxide (other than LiOH) and an alkaline earth metal hydroxide, in a non-aqueous suspension medium, to obtain an alkali hexafluorophosphate salt as a precipitate; and
    removing a liquid phase comprising the non-aqueous suspension medium, any unreacted organic Lewis base and any water that has formed during the reaction to form the precipitate, thereby to recover the alkali hexafluorophosphate salt.

2. The process according to claim 1, which includes reacting phosphoric acid with anhydrous hydrogen fluoride or aqueous hydrofluoric acid, to obtain the hexafluorophosphoric acid.

3. The process according to claim 1, wherein the organic Lewis base is an organic amine.

4. The process according to claim 3, wherein the organic amine is selected from pyridine, imidazole, and pyrole.

5. The process according to claim 4, wherein the organic amine is pyridine.

6. The process according to claim 1, wherein the alkali hydroxide is selected from sodium hydroxide and potassium hydroxide.

7. The process according to claim 6, wherein the alkali hydroxide is sodium hydroxide.

8. The process according to claim 1, wherein the non-aqueous suspension medium is an organic solvent.

9. The process according to claim 8, wherein the organic solvent comprises methanol or ethanol.

10. The process according to claim 9, wherein the organic solvent comprises ethanol.

11. The process according to claim 1, wherein the non-aqueous suspension medium is an aprotic medium.

12. The process according to claim 11, wherein the aprotic medium comprises an alkyl carbonate, a tetrahydrofuran ether, or acetonitrile.

13. The process according to claim 1, wherein the removal of the liquid phase is effected by decanting excess liquid phase from the precipitate, and heating the precipitate to a temperature up to 200° C. to evaporate residual liquid phase present on the precipitate.

* * * * *